(12) United States Patent
Benoit

(10) Patent No.: US 6,294,267 B1
(45) Date of Patent: *Sep. 25, 2001

(54) CORE PRINTED SECURITY DOCUMENTS

(75) Inventor: Gordon L. Benoit, Victor, NY (US)

(73) Assignee: ExxonMobil Oil Corporation, Fairfax, VA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/162,219

(22) Filed: Sep. 28, 1998

Related U.S. Application Data

(63) Continuation-in-part of application No. 09/064,993, filed on Apr. 23, 1998, now Pat. No. 5,879,028, and a continuation-in-part of application No. 08/467,484, filed on Jun. 6, 1995, which is a division of application No. 08/266,918, filed on Jun. 27, 1994, now Pat. No. 5,698,333, and a division of application No. 08/762,089, filed on Dec. 9, 1997, now Pat. No. 5,716,695, which is a division of application No. 08/601,886, filed on Feb. 15, 1996, now Pat. No. 5,618,630.

(51) Int. Cl.$^7$ .......................... B32B 27/08; B32B 27/00; B32B 27/06; B32B 27/40; B42B 15/00
(52) U.S. Cl. ................ 428/515; 428/43; 428/424.2; 428/483; 428/500; 428/516; 283/57; 283/58; 283/59; 283/107
(58) Field of Search ................. 283/57, 58, 59, 283/109, 117; 428/219, 411.1, 424.2, 483, 500, 515, 516, 910, 43

(56) References Cited

U.S. PATENT DOCUMENTS

| | | | |
|---|---|---|---|
| 3,322,613 | 5/1967 | Rasmussen | 161/234 |
| 4,095,217 | 6/1978 | Tani et al. | 340/324 |
| 4,281,208 | 7/1981 | Kuwano et al. | 136/249 |
| 4,331,725 | 5/1982 | Akao | 428/138 |
| 4,359,499 | 11/1982 | Akao et al. | 428/201 |
| 4,377,616 | 3/1983 | Ashcroft et al. | 428/213 |
| 4,447,494 | 5/1984 | Wagner, Jr. et al. | 428/349 |
| 4,472,627 | 9/1984 | Weinberger | 235/487 |
| 4,536,016 | 8/1985 | Solomon et al. | 283/111 |
| 4,565,733 | 1/1986 | Akoa | 428/215 |
| 4,632,869 | 12/1986 | Park et al. | 428/315.5 |
| 4,680,207 | 7/1987 | Murray | 428/35 |
| 4,681,803 | 7/1987 | Liu et al. | 428/248 |
| 4,758,462 | 7/1988 | Park et al. | 428/213 |
| 4,853,265 | 8/1989 | Warren | 428/34.9 |
| 4,865,908 | 9/1989 | Liu | 428/348 |
| 4,870,122 | 9/1989 | Lu | 524/488 |
| 4,943,780 | 7/1990 | Redding | 428/35.9 |
| 5,275,870 | 1/1994 | Halope et al. | 428/199 |
| 5,418,026 | 5/1995 | Dronzek, Jr. et al. | 428/40 |
| 5,449,200 | 9/1995 | Andric et al. | 283/67 |
| 5,543,191 | 8/1996 | Dronzek, Jr. et al. | 428/41.5 |
| 5,618,630 | 4/1997 | Benoit et al. | 428/500 |
| 5,698,333 | 12/1997 | Keough et al. | 428/379 |
| 5,716,695 | 2/1998 | Benoit et al. | 428/195 |
| 5,879,028 | * 3/1999 | Benoit | 283/72 |
| 5,935,696 | * 8/1999 | Benoit et al. | 428/219 |

FOREIGN PATENT DOCUMENTS

| | | |
|---|---|---|
| 488652 | 4/1976 | (AU) . |
| 1287527 | 8/1972 | (GB) . |

* cited by examiner

*Primary Examiner*—Paul Thibodeau
*Assistant Examiner*—Sheeba Ahmed
(74) *Attorney, Agent, or Firm*—Dennis P. Santini; T. Dean Simmons

(57) ABSTRACT

A laminated multilayer film substrate for use in the production of banknotes having an oriented polypropylene core layer with print features and at least one high density polyethylene layer on each side of the oriented polypropylene layer. The resultant films exhibit good embossability, dead-fold characteristics and other properties, and are difficult to counterfeit, making them highly suited for the production of bank notes and other security documents.

22 Claims, No Drawings

CORE PRINTED SECURITY DOCUMENTS

RELATED APPLICATIONS

This application is a continuation in part of U.S. application Ser. Nos. 09/064,993, filed Apr. 23, 1998, now U.S. Pat. No. 5,879,028; and Ser. No. 08/467,484 filed Jun. 6, 1995, which is a divisional of U.S. application Ser. No. 08/266,918, filed Jun. 27, 1994, now U.S. Pat. No. 5,698,333 and 08/762,089, filed Dec. 9, 1997, now U.S. Pat. No. 5,716,695, which is a divisional of U.S. application Ser. No. 08/601,886, filed Feb. 15, 1996, now U.S. Pat. No. 5,618,630, incorporated herein by reference.

FIELD OF THE INVENTION

The present invention relates to a multilayer film for use in the production of paper-like products such as bank notes, security documents, including travelers and bank checks, and to a method for their production. More particularly, the present invention relates to a multilayer film having the characteristics of the high quality papers typically employed in the production of bank notes and security documents.

BACKGROUND OF THE INVENTION

In the production of bank notes, security documents and the like, rag paper has been employed for over 300 years. As is well known, rag paper has several properties which are highly desirable in such applications, including dead foldability, tear resistance, printability, embossability and the inability to the delaminate.

These highly desired properties may be characterized as follows: deadfold is the ability of a substrate to be creased or folded and to retain the fold without opening. Tear resistance is the ability of a substrate to resist both initiated and uninitiated tears and punctures. Printability is the ability of the substrate to adsorb and bond inks used during the lithographic printing process. Embossability is the ability of the substrate to deform under the pressures of the intaglio printing process to form a raised image on the resulting bank note or security document, with the intaglio ink remaining on the raised, deformed region resulting in a high degree of tactility or feel to the bank note or security document. The inability to delaminate is the inability to separate entire layers after lamination. As may be appreciated, these properties combine to give bank notes and the like their familiar feel and functionality.

Banknotes fail for many reasons, including soiling, loss of stiffness, ink degradation and tears/holes. Loss of stiffness results in a banknote which can not be machined processed, i.e. in an automated teller machine (ATM), money changer or verification machine. Ink degradation may result from abrasion and human contact. The recent movement to coins is a direct effort to extend the life of low level denomination notes which are printed in greater quantities than higher denomination notes.

A longer life note would result in less initial printing of new notes, longer circulation life, lower transportation costs to and from point of origin and to and from destruction, lower destruction cost and less sorting of machine readable grades.

With the advent of color copiers and computer graphic scanners, the counterfeiting of bank notes has markedly increased. While there are active programs underway by major currency paper producers to make their substrate more secure through the use of watermarks, metallized threads and optical variable devices (OVD's), such as photochromics, holographics, and diffraction gratings, at this time, these efforts do not appear to hold much promise of thwarting counterfeiters.

A major fitness for use criteria in a security document is to ensure that the substrate cannot be separated to produce a master of each side of the document. Splitting of banknotes is a major counterfeiting strategy in underdeveloped countries. A multilayer security document, Tyvek®, failed in field use because it was possible to split the non-woven document using simple tools in the field.

Plastic substrates offer a major security feature if a clear "window" is incorporated into the bank note. This window would ensure that a scanner or color copier could not copy the note. Additionally, other security features can be incorporated into or onto the bank note, including reverse printing of the note to protect the security devices and the print.

Australian Pat. No. 488,652, discloses an approach to the production of security articles, particularly bank notes, and describes the serious problems which confront conventional bank notes with respect to forgery. The bank note disclosed therein comprises a substrate of opaque thermoplastic sheet material intimately bonded to a web of woven or unwoven thermoplastic fibers, the substrate being printed as desired and having bonded thereon one or more optically-variable security devices. The fibrous web was employed to impart durability, crumple-resistance and tear-strength to the note. Where a security device, such as a Moire pattern, was employed which depended for its optically variable properties upon the transmission of light, it was necessary to punch out a hole in the substrate, insert the device and bond it in place with further layers of transparent plastic sheet material.

Although samples of bank notes formed according to the disclosure of Australian Patent No. 488,652 were said to have performed most satisfactorily with respect to the durability and security of conventional notes, they were found to be rather complex in construction and relatively expensive to produce. Moreover, when transmission security devices were laminated between layers in the substrate, an area of weakness and high stress was created which reduced both durability and security.

Other disclosures relating to anti-counterfeiting techniques include U.S. Pat. Nos. 4,095,217 and 4,281,208, which relate to the use of a liquid crystal device driven by a photovoltaic element, such as a solar cell or an amorphous silicon material.

U.S. Pat. No. 4,472,627 relates to currency or other valuable documents containing a liquid crystal/photovoltaic device which produces a coded display in response to artificial or ambient light. The device can function both as an anti-counterfeiting deterrent and also as a means for permitting a user to easily authenticate the validity of a document containing such a device.

U.S. Pat. No. 4,536,016 discloses a security token, such as a bank note or identity card, which comprised a sheet-like substrate made up from film of transparent biaxially oriented polymer coated with layers of opaque and heat activated adhesive material. The opaque layer is applied in such a way as to leave a transparent area for inspection of a security device, for example, a diffraction grating, incorporated in the polymer film. The substrate could bear printed or other identifying indicia and was protected with an intimately bonded layer of transparent polymeric material.

The substrate employed in U.S. Pat. No. 4,536,016 was based on the use of oriented polypropylene (OPP). After several commemorative bank note printings, while meeting many of the requirements for a bank note substrate, the plastic bank notes were found to fail in three major areas. First, the OPP substrate did not dead fold, causing problems in that the film retains either a flat or curved form, jamming cash registers and automatic handling equipment. The OPP product also did not exhibit the tactility of paper currency, due to the fact that OPP does not emboss well during the intaglio process and was overcoated.

Oriented high density polyethylene films have been employed in the area of plastic packaging. Such films, biaxially oriented to a degree of greater than 6.5 times in both the machine direction (MD) and the transverse direction (TD) are described in British Patent 1,287,527. U.S. Pat. No. 4,680,207 relates to imbalanced biaxially oriented films of linear low density polyethylene oriented up to six times in the machine direction, and up to three times in the transverse direction but less than in the machine direction.

U.S. Pat. No. 5,618,630 relates to a three ply multilayer film structure for the production of banknotes.

While the aforementioned films have been shown to offer certain advantages over the prior art and generally meet the requirements for which they were designed, a need still exists for a film which provides the characteristics of a high quality, rag-type paper of the type typically employed in the production of bank notes and security products.

Therefore, it is an object of the present invention to provide a multilayer film having the characteristics of a high quality rag paper.

It is an object of the present invention to find a banknote which overcomes traditional failure criteria including loss of stiffness and ink degradation.

It is another object of the present invention to provide such a multilayer film which possesses the dead-fold characteristics of high quality papers while being easy to manufacture and reasonably durable.

It is a further object of the present invention to provide a multilayer film which possesses the inability to effectively separate entire layers without tearing.

It is yet another object of the present invention to provide a multilayer film which possesses the printability and embossability of a high quality paper.

It is yet a further object of the present invention to provide a multilayer film which possesses a high degree of resistance to curling at higher temperatures, e.g., above 150° F.

Still another object of the invention is to provide a multilayer film which is suitable for banknote production from which it is difficult to abrade inks resulting in banknotes of long service life. Such films can achieve high levels of durability without overlaying the inked surface with protective coatings such as lacquers or polyurethanes.

Still a further object of the present invention is to provide a multilayer film which is suitable for banknote production which is less likely to be counterfeited.

Other objects and the several advantages of the present invention will become apparent to those skilled in the art upon a reading of the specification and the claims appended thereto.

SUMMARY OF THE INVENTION

The present invention relates to the creation of a durable, long life banknote printed on the core only. The outer layers of the banknote are unprinted and provide protection from abrasion and chemical damage. The core printed note must be tactile enough to be perceived as a banknote. Surface embossing and blind intaglio printing, i.e. printing without ink, may be used on the laminated surface to provide a more paper-like appearance.

Generally, glossiness on the film outer surfaces is controlled to a 45° gloss measurement less than about 85%.

The basic print features of the banknote are printed on the core. Hidden and/or see through features are printed on the core first. Opacifying layers are applied to both sides of the core, hiding some of the hidden and/or see through features. The banknote surface images are printed last. Adhesive and outer film layers are then applied to each side of the note. All features are embedded inside of the multilayer film structure. No materials are left on the outside surfaces to wear off over time. The outer surfaces may be blind embossed to give the multilayer film structure tactility. The blind emboss may, however, wear over time but will not degrade the internal images.

The multilayer film of the present invention is a three ply structure. At least one core layer of high tensile strength (greater than about 18,000 lb./in$^2$ in both directions) is surrounded by at least one layer of high density polyethylene (HDPE) on either side of the core layer. The multilayer film of the present invention exhibits good performance in repetitive fold tests. The multilayer film structure of the present invention also has high tensile strength in both the oriented and unoriented direction. The multilayer structure of the present invention does not craze when crumpled in the print window.

The multilayer film of the present invention may be weakened in terms of tear resistance in at least one layer of the HDPE on either side of the core layer to prevent delamination. The tear resistance in one direction is at least ten times greater than the tear resistance in the other direction.

In accordance with the present invention, there is provided a curl-resistant, cross-sectionally symmetrical, laminated multilayer film substrate for use in the production of banknotes, security papers and the like comprising:

(a) an unprinted imbalanced biaxially oriented first layer having inner and outer sides, comprising at least about 50 weight percent of a high density polyethylene having a density of at least about 0.94, said first layer being oriented in at least a first direction to a degree which is at least three times less than the degree of orientation present in a second direction substantially normal to the first direction;

(b) a balanced biaxially oriented second layer having inner and outer sides and a tensile strength of greater than about 18,000 lb./in$^2$, wherein said second layer comprises print features on at least one outer side, said second layer being oriented in at least a first direction, at an orientation ratio of at least 4:1, and oriented in a second direction substantially normal to said first direction, at an orientation ratio of at least 6:1,;

(c) an unprinted imbalanced biaxially oriented third layer having inner and outer sides, comprising at least about 50 weight percent of a high density polyethylene having a density of at least about 0.94, said third layer being oriented in at least a first direction to a degree which is at least three times less than the degree of orientation present in a second direction substantially normal to the first direction; and (d) a laminating adhesive resin disposed between the inner sides of (a) and (c), said second layer being laminated to said first and third layers so that the first direction of orientation of said third layer is substantially aligned with the first direction of orientation of said first layer and wherein (a) further comprises a coextruded propylene copolymer skin on its inner side.

DETAILED DESCRIPTION OF THE INVENTION

In forming the multilayer film of the present invention at least one layer of the substrate comprises oriented polypropylene (OPP) or other biaxially oriented polymers of a comparable tensile strength. The use of OPP in the core results in high tensile properties and high performance in repetitive fold tests. In addition, there is no crazing in the print windows after hand crumpling when using the three ply structure of the present invention.

The core layer, having a thickness in the range of about 1 to about 2.25 mils, is biaxially oriented to provide tensile strength and a stable printing surface. In the absence of windows, the use of an opaque film layer would minimize the opacifying coating required. The outer film layers are for protection only.

It is preferred to use oriented polypropylene (OPP) in the core. However, other biaxially oriented polymers of a comparable tensile strength, generally greater than about 18000 lb./in$^2$, such as linear low density polyethylene (LLDPE), nylons or polyester may also be used. It is preferred that the OPP core be free of any additives, for example, anti-static agents and silicone, which have an impact on adhesion to other layers.

In forming the multilayer film substrates for use in the production of the bank notes and other security documents of the present invention, at least two layers of the substrate are to contain a major proportion of a high density polyethylene (HDPE) having a density of at least about 0.94, preferably at least about 0.945, more preferably at least about 0.95. These film layers may be composed exclusively of a single HDPE resin, a mixture of HDPE resins, or of HDPE containing a minor proportion of another polymeric material, such as low density polyethylene (LDPE), linear low density polyethylene (LLDPE), polypropylene, ethylene vinyl alcohol (EVOH) copolymer, ethylene propylene (EP) copolymer or ethylene propylene butene-1 (EPB) copolymer, although a single HDPE resin or a blend of HDPE resins is particularly preferred in the practice of the present invention.

When blends of HDPE polymers are employed, such blends can comprise two or more polymers all of which preferably have densities of 0.94 or greater. Blends of HDPE polymers advantageously comprise a major proportion of HDPE having a melt index of 0.6 to 1.2 and one or more polymers having a different melt index.

Terblends may also be desirable. Suitable terblends generally comprise 50 to 98 weight percent, preferably 84 to 96 weight percent of HDPE having a density of 0.96 or higher and a melt index of greater than 0.5 to about 2.0; 1 to 25 weight percent, preferably 3 to 8 weight percent of HDPE having a density of 0.94 or greater and a melt index of 0.1 to 0.5; and 1 to 25 weight percent, preferably 3 to 8 weight percent, of HDPE having a density of 0.96 or higher and a melt index of greater than 2 to about 8. Preferably, the second and third HDPE polymers which are minor components are present in about equal amounts.

As is particularly preferred, the film substrate of the present invention includes a) a first layer comprising at least about 50 weight percent of a high density polyethylene having a density of at least about 0.94, the first layer oriented in at least a first direction, e.g., machine direction (MD), to a degree which is at least three times less than the degree of orientation present in a second direction substantially normal to the first direction, e.g., transverse direction (TD); (b) a second layer comprising at least about 90 wt. % polypropylene, the second layer being oriented in at least a first direction e.g., machine direction (MD), at an orientation ratio of at least 3:1, and oriented in a second direction substantially normal to said first direction e.g., transverse direction (TD), at an orientation ratio of at least 6:1; and c) a third layer also comprising at least about 50 weight percent of a high density polyethylene having a density of at least about 0.95, the third layer also oriented in at least a first direction, e.g., MD, to a degree which is at least three times less than the degree of orientation present in a second direction, e.g., TD, substantially normal to the first direction, the third layer being laminated to the film substrate so that the first direction of orientation of the third layer is substantially parallel to (or aligned with) the first direction of orientation of the first layer.

A method of producing HDPE films with imbalanced biaxial orientation is disclosed in U.S. Pat. No. 4,870,122, the contents of which are incorporated by reference in their entirety.

The films are produced and oriented in a conventional manner. The film is heated to its orientation temperature and first subjected to MD orientation between two sets of nip rolls, the second rotating at a greater speed than the first in an amount equal to the desired draw ratio. Then the film is TD oriented by heating and subjecting it to transverse stretching in a tenter frame. Typically MD orientation is conducted at 60 to 120° C. and TD orientation at 110 to 145° C.

While it is preferred that the degree of orientation in a first film direction be at least three times less than the degree of orientation present in a direction substantially normal to the first direction, it is more particularly preferred that each HDPE film layer be oriented to an extent of about 1.1 to about 2.0 times in the machine direction (MD) and about 6 to about 12 times in the transverse direction (TD). It has been found that the HDPE film layers can be produced with excellent quality at caster speeds of up to about 110 feet per minute (fpm) corresponding to line speeds of 140 fpm at 1.25 times MD orientation. In the alternative, the degree of orientation in a first film direction can be at least three times greater than the degree of orientation present in a direction substantially normal to the first direction. Even unoriented blown HDPE may be used as the first and third layers and still maintain some degree of deadfold in the multilayer film substrate of the present invention.

When employed, this degree of imbalanced orientation produces an interesting effect in the HDPE components of the structure. The effect is a visible rippled and striated appearance, with the ripples being parallel to the transverse orientation direction. Under low magnification, in each square centimeter of HDPE film there will be seen from about 5 to about 30 discontinuous undulating ripples and striations generally parallel to the direction of orientation. This effect gives the film a slight translucent appearance, which tends to slightly blur distant objects viewed through the film. This effect indicates that the layers have been oriented in an imbalanced manner. The high density polyethylenes contemplated for use in the practice of the present invention include those disclosed in U.S. Pat. No. 4,870,122.

In the oriented polypropylene layer the orientation is adjusted to give essentially balanced tensile properties in both directions.

To achieve the desired surface characteristics required of the paper-like products of the present invention, one or more skin layers can be applied, in any known manner, to the multilayer HDPE substrate material, for example by coating or coextrusion before orientation or by coating the HDPE after one or both of the orientation operations. The skin layer can be any of the conventional materials used for this purpose in conjunction with polyolefin films, particularly polyethylene films. For example, to achieve a press-ready surface, a polymeric resin could be blended with fillers, fibers, pigments or the like, as necessary. Additionally, voided films, such as those disclosed in U.S. Pat. Nos. 4,377,616, 4,632,869, 4,758,462 and others, may be laminated to the multilayer HDPE substrate to impart the opacifying properties of those structures to the films of the present invention.

The HDPE layers have a thickness in the range of from about 0.5 to about 1.5 mils.

The HDPE-containing layers (a) and (c) as disclosed above can further comprise copolymer polypropylene skins, e.g., ethylene-propylene-butene-1 terpolymer, provided on at least one side thereof, preferably on both the inner and outer sides thereof. In one embodiment, the skins themselves can also comprise a component which is similar to components in the adhesive resin used to laminate layers (a), (b) and (c). For example, low density polyethylene (LDPE) can make up from 10 to 20 wt. of the skins, with the balance being a copolymer polypropylene.

A suitable adhesion-promoting primer which provides greater adhesion between the laminated surfaces and the opacifying layers and print caps, e.g., polymers selected from the group consisting of polyethyleneimide, epoxy, polyurethane, and acrylic, can be provided between the HDPE layers and the coated surface. Primer compositions are disclosed in U.S. Pat. Nos. 4,447,494 and 4,681,803, which are incorporated herein by reference.

In the present invention, the OPP core is printed on both sides to provide visual identification of the nature of a banknote, its significance or value. Printing on the core is also a security feature as well. Any flexo or gravure printable ink, either colors or machine readable ink, such as IR, UV and magnetic inks, can be used for the print features. There is no printing on the outside layers.

It has been found that all printing on the core film layer improves the durability of the banknote. The banknote cannot be split because all the printing is on one layer. There is no printing on the outer layers to wear off resulting in a longer circulation life. The embedded features are also protected. There is no soiling and no adsorption of bacteria or viruses into the multilayer layer film structure of the present invention. Further, there is no ability to adsorb moisture or oils and no odor.

The outer HDPE layer(s) may be embossed, texturised or otherwise treated before or after lamination; this being done on the internal or external surfaces of the laminated layers, so as to provide, for example to provide tactile identification.

The laminating techniques which can be employed to effect the present invention are known in the art and include: adhesive-bonding or cementing, e.g., with laminating adhesive resins, preferably with a transparent agent; solvent-bonding, where a mist of solvent is sprayed over the surfaces to be bonded together; thermal lamination by heat-bonding where thermoplastic sheets are subject to a hot rolling or pressing operation; cast-lamination where one layer is cast onto the second and the second forms a substrate; or, extrusion or draw-lamination as in calendering operations known in the art. The laminating adhesive resin is stronger than the outer surface layers.

The use of solventless or 100% solids adhesive resins, such as a 2-part polyurethane resin, WD4110, available from H.B. Fuller Co., is particularly preferred. 100% solids laminating adhesives are an effective alternative to solvent-based adhesives. 100% solids laminating adhesives impart excellent clarity, enhancement of printing, high bond strength and heat sealing resistance to the multilayer film laminated structure of the present invention.

When discrete security devices are incorporated within the substrate, e.g., optically-variable devices (OVD's), they can be enclosed in pouches affixed to the substrate. On the other hand, the optically-variable devices themselves may be incorporated in one (or both) layers of the laminated substrate or between the layers, it not being necessary to incorporate a physically discrete device within a clearly defined pouch formed between the layers.

Any suitable security device can be employed in the present invention such as one selected from the group consisting of optically variable devices (OVDs), magnetic devices, electronic devices, and rare earth element-containing devices, with OVDs particularly preferred.

As employed in the present specification, the term "optically-variable" is used to denote any device which can readily be made to change appearance in a reversible, predictable and reproducible manner. The appearance of such devices may be altered, for example, by the application of body-heat or manual pressure, the variation of the angle of viewing and, the lighting conditions under which viewing takes place. The type of devices envisioned by the present invention are: diffraction gratings, liquid crystals, moire patterns and similar patterns produced by cross-gratings with or without superimposed, refractive, lenticular and transparent grids, such as Fresnel lenses, spaced partially-reflective, and partially transparent, coatings yielding variable interference patterns or the like, bi-refringent or polarizing layers, zone-plates and the like.

Generally, optically-active devices of this nature are readily recognized by unskilled persons and are yet extremely difficult to reproduce by photographic and printing techniques. Moreover the production of any one such device in a reproducible fashion and the incorporation of such a device in a plastic laminate as described by the present invention is likely to be beyond the resources of the great majority of would-be forgers. Where a flexible paper-like product such as a bank-note is sought, it is of course preferable that the optically-variable devices should, themselves, be sheet-like, flexible and thin; it is also preferable for such devices to be compatible with the plastic material employed for the laminae to facilitate bonding and mitigate against reactive changes occurring with time.

According to the present invention, one preferred form of optically variable device may be a reflecting diffraction grating consisting of a metallized thermoplastic film embossed with a diffraction pattern. To prevent access to the embossed pattern for the purpose of illicit replication, it is preferable according to the present invention to employ a layer of thermoplastic material on each side of the metallized film which has similar solubility characteristics to that of the metal layer so that separation by preferential etching will be rendered extremely difficult. Another preferred device is a moire pattern formed by photographically reproducing fine line or dot patterns on each side of a thin film. The spacing of the dots and lines can be readily made too fine to be reproduced by printing techniques and yet the moire pattern can be displayed upon a much larger scale. Unique diffraction and moire patterns will often be preferred for use in bank notes and techniques are available for producing those by computer and photo-reduction methods.

In the production of low denomination banknotes, a suitable level of security against counterfeiting may be obtained by merely providing a clear "window" through the bank note. As indicated above, such a window would ensure that a scanner or color copier could not copy the note. Additionally, other security features can be incorporated into or onto the bank note, including printing on the core layer of the note to protect the security devices and the print. In the present invention, there is no printing on the outer film layers. All of the print features are buried under several film layers which provides enhanced durability and makes the banknote difficult to reproduce.

It has been found that films similar to those of the present invention but which are "cross-oriented," can be susceptible to curling at temperatures above 150° F. Such cross-oriented films are similar to those of the present invention except that the second layer is laminated to the film substrate so that the first (primary) direction of orientation of the second layer is substantially normal to the first (primary) direction of orientation of the first layer. It is believed that such curling can result from differences in shrinkage at high temperatures in the machine direction and transverse direction of each layer. Additional curling susceptibility can result where coatings or skins of the layers have different coefficients of contraction from the HDPE component of the layers. Such imbalanced contraction and its attendant curling can be avoided by counterbalancing the overall shrinkage properties of one layer by laminating thereto a second layer identical to the first layer which is provided as a mirror image of the first layer. In other words, one half of the layered film structure is a mirror image of the other, with the plane of symmetry being along the horizontal midline of the layered film structure cross-section. This provides a cross-sectionally symmetrical layered film structure. Examples of such films include those of ABA, ABBA, ABCCBA, ABCDCBA, etc. construction where each letter represents a film layer, skin, coating, or adhesive layer. Such a cross-sectionally symmetrical layered film structure is necessarily a "parallel-oriented" structure, i.e., the primary direction of orientation of the first layer is parallel to the primary direction of orientation of the second layer in order to meet the mirror image requirement. Such a construction provides a symmetrical structure wherein the opposing shrinkage forces counteract each other to a significant degree. However, such a two layer parallel construction can be susceptible to poor tear properties in one direction, e.g, TD where two TD oriented films are employed.

It has also been found that by using a 100% solids resin as the laminating adhesive resin employed, orientation effects resulting from the lamination procedure are improved, resulting in a multilayer film exhibiting curl resistance and improved chemical resistance.

One or both of the HDPE containing layers may be weakened in terms of tear resistance in one direction to a point where they are significantly weaker than the laminating adhesive resin and the OPP containing core layer. When attempting to delaminate the structure for counterfeiting purposes, only small strips of the outer printed HDPE containing layers would be removed. The entire HDPE containing layers would not be removable.

The HDPE containing layer can be tear weakened using process conditions during manufacture. Microperforating with laser technology and/or nicking will also cause the HDPE containing layers to weaken. The microperforations are either diagonal or unidirectional, e.g. in the range of from about 50 to about 300 dots per inch (dpi).

The HDPE layers can also be tear weakened through the addition of incompatible additives that would cause the layer to fibrilate or fracture during orientation. Suitable incompatible polymer additives which effect crystallization include polyester (PET), polybutylene terephthalate (PBT), polystyrene or a mixture thereof. Generally, from about 1 to about 10 wt. %, preferably from about 4 to about 8 wt. % of incompatible additive is added to the HDPE layer(s). Fibrillation results in regions of oriented HDPE surrounding long, planar regions of the incompatible polymer resulting in low tear regions.

The OPP core layer is not weakened and essentially provides the tensile properties and tear resistance of the structure as a whole.

The invention is further illustrated by the following non-limiting examples in which all parts are by weight unless otherwise specified.

EXAMPLE 1

This example demonstrates the preparation of a multilayer film substrate produced in accordance with the present invention which is suitable for preparing banknotes having good dead fold characteristics.

A multilayer oriented film substrate having a 1.15 mil final thickness is prepared by coextruding with copolymer polypropylene skins on both sides to form a first layer (a). The HDPE layer comprises 100% HDPE (Oxychem M-6211, available from accidental Chemical Corp., Dallas, Tex., having a density of 0.96 and a melt index of 1.0). The copolymer polypropylene skins comprise 90 wt. % Chisso 7510, an ethylene-propylene-butene-1 terpolymer, available from Chisso Corp. of Japan, and 10 wt. % Nobil LKA-753, a low density polyethylene available from Mobil Chemical Co., Norwalk, Conn. HDPE comprises about 90 wt. % of the resulting film layer (a) while the skins comprise 10 wt. % (5 wt. % on each side). The film (a) is then oriented 1.4 times in the MD at about 115° C. and 6 to 12 times, e.g. 10 times in the TD at about 115–140° C. in a tenter frame.

The HDPE layers are microperforated at lamination. The microperforation is in a diagonal pattern through both layers at a 45 degree angle with a quarter inch spacing between perforations.

Layer (a) is 100% solids adhesively laminated to an OPP layer (b) described below using a 2-part polyurethane resin, WD4110, available from H. B. Fuller Co.

The OPP layer is 2.0 mil final thickness prepared using FINA 3371 Homopolymer polypropylene in the core at 109 gauge units and 2 skin layers of 3 gauge units of Lyondell M60-30 high density polyethylene. The MG60-30 may contain processing aids and/or surface modifiers. Prior to lamination, a grid pattern except for a clear window is provided on each side of OPP layer (b). Transparent images or graphics are next provided on each side of the OPP layer (b). OPP layer (b) is then printed on each side. An opacifying layer is optionally added on both sides of the OPP layer.

The 2 ply layer is again 100% solids laminated with Fuller WD4110 to another HDPE layer described above and the outer film layers are then surface embossed.

Although the present invention has been described with preferred embodiments, it is to be understood that modifications and variations may be utilized without departing from the spirit and scope of this invention, as those skilled in the art will readily understand. Such modifications and variations are considered to be within the purview and scope of the appended claims.

It is claimed:

1. A curl-resistant, cross-sectionally symmetrical, laminated multilayer film substrate for use in the production of banknotes and security papers comprising:
   (a) an unprinted, imbalanced biaxially oriented first layer having inner and outer sides, comprising at least about 50 weight percent of a high density polyethylene having a density of at least about 0.94, said first layer being oriented in at least a first direction to a degree which is at least three times less than the degree of orientation present in a second direction substantially normal to the first direction;
   (b) a balanced biaxially oriented second layer having inner and outer sides and a tensile strength of greater than about 18,000 lb./in$^2$, wherein said second layer comprises print features on at least one outer side, said second layer being oriented in at least a first direction at an orientation ratio of at least 4:1 and oriented in a second direction substantially normal to said first direction at an orientation ratio of at least 6:1;
   (c) an unprinted, imbalanced biaxially oriented third layer, wherein the ratio of initiated tear resistances is greater than about 10:1, having inner and outer sides, comprising at least about 50 weight percent of a high density polyethylene having a density of at least about 0.94, said third layer being oriented in at least a first direction to a degree which is at least three times less than the degree of orientation present in a second direction substantially normal to the first direction; and
   (d) a laminating adhesive resin disposed between the inner sides of (a) and (c), said second layer being laminated to said first and third layers so that the first direction of orientation of said third layer is substantially aligned with the first direction of orientation of said first layer and wherein (a) further comprises a coextruded propylene copolymer skin on its inner side.

2. The film substrate of claim 1 wherein said second layer comprises polypropylene and/or polyester.

3. The film substrate of claim 1, having a 45° gloss measurement less than about 85%.

4. The film substrate of claim 1 wherein (a) is surface embossed.

5. The film substrate of claim 1 wherein (a) and (c) are surface embossed.

6. The film substrate of claim 1 wherein (a) has diagonal and/or unidirectional microperforations.

7. The film substrate of claim 6 wherein said microperforations are in the range of from about 50 to about 300 dots per inch.

8. The film substrate of claim 1 wherein (a) and (c) have diagonal and/or unidirectional microperforations.

9. The film substrate of claim 1 wherein both (a) and (c) further comprise a copolymer polypropylene skin on at least one side thereof.

10. The film substrate of claim 1 wherein (d) comprises a solventless adhesive.

11. The film substrate of claim 10 wherein (d) comprises polyurethane.

12. The film substrate of claim 1 wherein (d) comprises a component selected from the group consisting of low density polyethylene (LDPE) and linear low density polyethylene (LLDPE).

13. The film substrate of claim 1 further comprising (e) a security device between (a) and (c).

14. The film substrate of claim 11 wherein said security device is selected from the group consisting of optically variable devices (OVDs), magnetic devices, electronic devices, and rare earth element-containing devices.

15. The film substrate of claim 1 further comprising (e) a security device printed on layer (b) prior to laminating with laminating adhesive resin (d).

16. The film substrate of claim 9 wherein said copolymer polypropylene skins on said outer sides are externally coated with an opacifying coating.

17. The film substrate of claim 13 further comprising a clear window through the film substrate.

18. The film substrate of claim 1 in the form of a bank note.

19. The film substrate of claim 1 wherein said first direction is machine direction (MD) and said second direction is transverse direction (TD).

20. A curl-resistant, cross-sectionally symmetrical, laminated multilayer film substrate for use in the production of banknotes and security papers comprising:
   (a) an unprinted, imbalanced biaxially oriented first layer having inner and outer sides, comprising at least about 50 weight percent of a high density polyethylene having a density of at least about 0.94, said first layer being oriented in at least a first direction to a degree which is at least three times greater than the degree of orientation present in a second direction substantially normal to the first direction;
   (b) a balanced biaxially oriented second layer having inner and outer sides and a tensile strength of greater than about 18,000 lb./in$^2$, wherein said second layer comprises print features on at least one outer side, said second layer being oriented in at least a first direction at an orientation ratio of at least 4:1 and oriented in a second direction substantially normal to said first direction at an orientation ratio of at least 6:1;
   (c) an unprinted, imbalanced biaxially oriented third layer having inner and outer sides, comprising at least about 50 weight percent of a high density polyethylene having a density of at least about 0.94, said third layer being oriented in at least a first direction to a degree which is at least three times greater than the degree of orientation present in a second direction substantially normal to the first direction; and
   (d) a laminating adhesive resin disposed between the inner sides of (a) and (c), said second layer being laminated to said first and third layers so that the first direction of orientation of said third layer is substantially aligned with the first direction of orientation of said first layer and wherein (a) further comprises a coextruded propylene copolymer skin on its inner side.

21. The film substrate of claim 20 wherein said first direction is machine direction (MD) and said second direction is transverse direction (TD).

22. A curl-resistant, cross-sectionally symmetrical, laminated multilayer film substrate for use in the production of banknotes and security papers comprising:
   (a) an unprinted first layer having inner and outer sides, comprising at least about 50 weight percent of an unoriented, blown high density polyethylene having a density of at least about 0.94;

(b) a second layer having inner and outer sides and a tensile strength greater than about 18,000 lb./in$^2$, wherein said second layer comprises print features on at least one outer side, said second layer being oriented in at least a first direction at an orientation ratio of at least 4:1 and oriented in a second direction substantially normal to said first direction at an orientation ratio of at least 6:1;

(c) an unprinted third layer having inner and outer sides, comprising at least about 50 weight percent of an unoriented, blown high density polyethylene having a density of at least about 0.94;

(d) a laminating adhesive resin disposed between the inner sides of (a) and (c) and wherein (a) further comprises a coextruded propylene copolymer skin on its inner side.

* * * * *